May 29, 1962 D. BIER 3,037,113
CONTROL SYSTEM
Filed Oct. 12, 1959
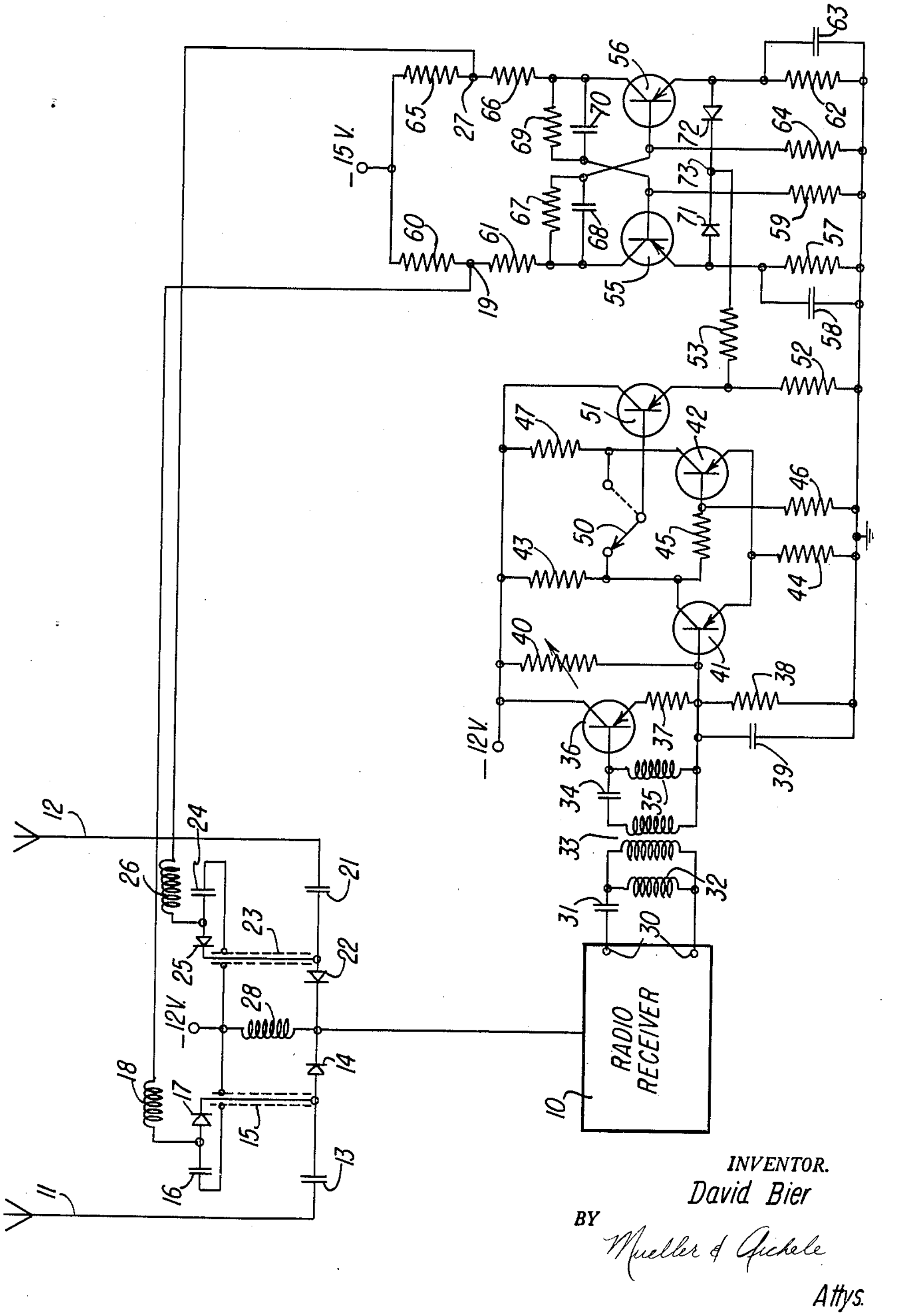
INVENTOR.
David Bier
BY
Mueller & Aichele
Attys.

1

3,037,113
CONTROL SYSTEM
David Bier, Chicago, Ill., assignor to Motorola, Inc., Chicago, Ill., a corporation of Illinois
Filed Oct. 12, 1959, Ser. No. 846,008
15 Claims. (Cl. 250—20)

The invention relates generally to radio communications and more particularly to a selecting system for connecting the antenna providing an adequate signal to the frequency modulation receiver in a diversity receiving system.

Space diversity reception in which one of a plurality of antennas is selectively connected to a receiver is well known in the art. However, such systems have been used in fixed installations and in providing diversity reception in mobile systems new problems are encountered. For example, as the antennas are installed on a vehicle they must be closely spaced and interaction between the antennas may take place. Further, sudden changes in signal strength may take place because of movement of the vehicle with respect to other objects.

Another problem arises in switching of antenna connections in diversity receiving systems when pulse signals are being transmitted. For such communications, in order that information is not lost, it is necessary that switching takes place as soon as the signal fades and that the switching time is very short. Prior mechanical switching systems were slow to act and had unduly long switching time and are therefore unsuitable for diversity systems handling pulse signals.

It is therefore an object of the present invention to provide an improved antenna selection and switching system for mobile space diversity receiving systems.

A further object of the invention is to provide an antenna connecting circuit for selectively connecting one of a plurality of antennas to a receiver and which is effective to isolate the antenna not connected to prevent interaction between antennas.

Another object of the invention is to provide an antenna selection system which responds to noise or a control signal and operates rapidly to provide a control voltage to cause switching of the antenna connections.

Still another object of the invention is to provide an antenna switching circuit which alternately connects different antennas to a receiver and which is latched when a signal of the desired strength is received so that the antenna which is connected remains connected until the signal fades to an unusable level.

A feature of the invention is the provision of a stable detector circuit responding to signals of a particular frequency, or a band of frequencies such as a band including noise, for providing a control voltage, and which utilizes a transistor with a tuned input circuit to provide high input impedance to the signals, and a low impedance output circuit providing the control voltage.

Another feature of the invention is the provision of an antenna connection circuit for a diversity receiving system wherein each antenna is selectively connected to the receiver by a circuit utilizing semiconductor diode elements as switching devices to provide effective decoupling of antennas not being utilized. The switching circuit responds to control voltages to provide extremely fast operation with negligible switching time.

A further feature of the invention is the provision of a switching or selective connecting circuit including a first diode connected in series in the circuit and a quarter wave line shunted by a second diode connected to the circuit, with a series circuit through the diodes for biasing the same, wherein the diodes may be back biased so that the first diode presents a high impedance in the circuit and the second diode opens the remote end of the quarter wave line to short the antenna circuit, and the diodes may be rendered conducting so that the first diode forms a low impedance path and the second diode shorts the remote end of the quarter wave line so that the short on the antenna circuit is removed.

2

The invention is illustrated in the attached drawing wherein the single figure shows the control and switching circuits for selectively connecting spaced antennas to a receiver.

In practicing the invention, a space diversity receiving system is provided including two spaced antennas for selectively applying signals to a frequency modulation receiver. The antennas are each connected to the receiver through a diode, with a quarter wave line shorted by a second diode connected to the antenna circuit. The diodes are initially back biased to decouple the antenna from the receiver and short the antenna line, and are forward biased to connect the antenna to the receiver with the first diode providing a low impedance path, and the second shorting the remote end of the line so that the short is removed from the antenna. Two control voltages for the two switching circuits are applied from the two stages of a multivibrator which includes a latching circuit for holding the same in a bistable condition. When in a bistable condition, the stage which is conducting remains conducting to apply a voltage to the switching circuit so that the antenna connections remain fixed. When the latching circuit is released, multivibrator action takes place with the stages alternately conducting to apply voltage to the switching circuit so that the antennas are alternately connected. Control of the latching circuit may be provided by a detector responding to noise at the audio output of the receiver so that when substantial noise is received with a weak signal, a control voltage is developed which releases the latching action. The noise is detected in a transistor circuit the input of which is tuned to the band of frequency utilized for control, and which presents a high impedance to the alternating frequency control signals. Alternately the detector may respond to desired signals of a particular frequency to provide a desired control.

Referring now to the drawing, there is illustrated a frequency modulation receiver 10 to which signals are applied by antennas 11 and 12. The antenna 11 is coupled to the receiver through capacitor 13 and diode 14. Connected between capacitor 13 and diode 14 is a transmission line 15 of a length to form a quarter wave stub at the frequency being received, and shorted by diode 17. Capacitor 16 serves as a blocking capacitor and may also be used for precisely tuning the stub. A switching circuit for biasing the diodes 14 and 17 conductive extends through choke 18 from the terminal 19. When the diodes are back biased the diode 14 presents a substantial impedance to the signal from antenna 11, and the diode 17 open circuits the remote end of the transmission line or stub so that the end connected to the antenna input line is effectively shorted to ground. This decouples the antenna 11 from the receiver 10. When the diodes are forward biased, the diode 17 shorts the transmission line so that the end connected to the antenna input line is open, and the diode 14 provides a low impedance connection to effectively connect antenna 11 to the receiver 10.

Similarly the antenna 12 is coupled to the receiver 10 through capacitor 21 and diode 22. Transmission line 23 forms a quarter wave stub connected between capacitor 21 and diode 22, and is shorted by diode 25. Capacitor 24 serves to block direct current and may be used for tuning similarly to capacitor 16. A switching circuit extends through choke 26 from the point 27. The antenna 12 is connected to the receiver 10 when the diodes are forward biased and is isolated therefrom when the diodes are back biased in the same manner as described above for antenna 11. A coil 28 is connected to a negative potential at terminal 29 to complete the switching circuits as will be further described.

The audio output of the frequency modulation receiver is derived across terminals 30, with noise appearing with the signal above the modulating frequencies being selected by the high pass filter including capacitor 31 and coil 32. This noise signal is applied through matching transformer 33 to a tuned detector having a series resonant input circuit including capacitor 34 and coil 35. The resonant circuit increases the amplitude of the desired signals, with the stepped up signal across coil 35 being applied to the input circuit of transistor 36. The transistor 36 serves as a detector and amplifier, with the input signal being applied through resistor 37 across the base and emitter electrodes of the transistor. This circuit has the advantage that it has a high alternating current input impedance so that it does not objectionably load the signal source. The transistor input circuit has a high pass filter characteristic which further facilitates the selection of the noise signals. The circuit has good temperature stability as the direct current impedance of coil 35 which forms the base return is low. Resistor 37 is selected to provide large degenerative feedback for both the signal and direct current. The detected output of the transistor 36 appears across resistor 38 bridged by capacitor 39 to provide the desired time constant. The output impedance is low and this facilitates coupling to the base of the next transistor.

The detector output is applied to a Schmitt trigger circuit including transistors 41 and 42. The detector output is applied through resistor 44 across the base and emitter electrodes of the transistor 41. The base electrode of the transistor 41 is connected to the source potential through adjustable resistor 40 which sets the level at which the trigger circuit will operate. The collector electrode of transistor 41 is connected through resistor 43 to the source potential and through resistor 45 to the base of transistor 42, which in turn is connected to ground through resistor 46. The collector of transistor 42 is connected to the negative source potential through resistor 47, and the emitter of this transistor is connected to the emitter of transistor 41.

The output of the trigger circuit is taken from one of the collectors of transistors 41 and 42 by a switch 50. This is shown connected to the collector of transistor 41, but may be switched to the collector of transistor 42 as shown by the dotted line. The switch 50 applies a control potential to the base of transistor 51 which is connected to form an emitter follower, with the emitter being connected to ground through resistor 52 and the collector being connected to the bias potential. Resistor 53 applies a current from the emitter to the latching multivibrator in accordance with the control potential applied to the base of transistor 51.

The latching multivibrator which produces the potentails for switching of the antennas includes transistors 55 and 56. The emitter of transistor 55 is connected to ground by resistor 57 which is bypassed by capacitor 58. The base of transistor 55 is connected to ground through resistor 59. The collector of transistor 55 is connected to a negative potential through resistors 60 and 61. Similarly transistor 56 has its emitter connected to ground through resistor 62 bypassed by capacitor 63, and its base connected to ground through resistor 64. The collector is connected to the negative potential through resistors 65 and 66. The collector of transistor 55 is connected to the base of transistor 56 by resistor 67, bypassed by capacitor 68, and the collector of transistor 56 is connected to the base of transistor 55 by resistor 69, bypassed by capacitor 70.

The circuit including transistors 55 and 56 which has been described forms a multivibrator wherein the stages alternately conduct. To provide latching action, diodes 71 and 72 are connected between the emitters of transistors 55 and 56. When sufficient current flows from terminal 73 through this circuit, the two stages act as a bistable circuit with either stage remaining conducting until some action causes the other stage to conduct, and then the second stage in turn remaining conducting in a stable manner. The diodes 71 and 72 act as switches to divert the bias current flowing from transistor 51 to the emitter resistor of whichever transistor is cut off and this holds the transistor stages in a bistable condition.

Assuming that the transistor 55 is conducting and the transistor 56 is cut off, the transistor 56 will remain cut off until capacitor 68 and capacitor 63 discharge. When these capacitors discharge, the potential between the emitter and base of transistor 56 will permit this transistor to conduct. This will cut off transistor 55 and the two transistors will conduct alternately in the normal multivibrator manner. When transistor 51 conducts, current will flow through resistor 53 to the junction of diodes 71 and 72. When the transistor 55 is conducting the current flows through diode 72 to prevent discharge of capacitor 63 and maintain the potential at the emitter, and this holds the transistor 56 cut off. Similarly, if transistor 56 is conducting current through resistor 53 will pass through diode 71 to emitter resistor 57 of transistor 55 to maintain the emitter potential and hold this transistor cut off.

When the rectified noise voltage applied to transistor 41 is not sufficient to cause this transistor to conduct, as when a strong signal is received, the collector electrode will be at a potential near that of the negative source. The base of transistor 51 which is connected through switch 50 to the collector of transistor 41 will be at this negative potential so that the transistor 51 supplies relatively heavy emitter current which is adequate to maintain the voltage across the emitter resistor of either transistor 55 or 56, whichever is cut off. However, when the noise voltage increases so that the transistor 41 saturates, the collector current will cause a voltage drop across resistor 43 so that the voltage applied to the base of transistor 51 is greatly reduced. In this condition the transistor will not supply sufficient bias current through the diodes 71 and 72 and the diodes will in effect open the circuit between the emitters of transistor 55 to cause the standard multivibrator action referred to above.

Considering now the action of the transistors 55 and 56 to control the switching circuit, the collector current from transistor 55 flows through resistor 61 to point 19 and through diodes 17 and 14 to the minus 12 volt supply. When the transistor 55 is conducting saturation current is drawn through the diodes so that they offer little resistance. Similarly when transistor 56 conducts the collector current flows through resistor 66 to point 27 and through diodes 25 and 22 to the minus supply. Here again when transistor 56 conducts the diodes offer little resistance. The points 19 and 27 are connected through resistors 60 and 65 respectively to a minus fifteen volt supply and this insures that the diodes of the switching circuit are completely cut off when the transistors do not conduct. This is necessary since the base current of the conducting transistor flows through the collector resistance of the off transistor and would apply some bias to the diodes even when the transistor coupled thereto is cut off.

When transistor 55 is conducting, the diodes 14 and 17 are forward biased so that they have very little resistance, and antenna 11 is connected to the receiver through a low impedance circuit including capacitor 13. Diode 14 offers little resistance, and the diode 17 shorts the transmission line so that the end of the transmission line or stub connected to the antenna circuit is virtually an open circuit and the line does not short out the antenna 11. At the time when diodes 14 and 17 are conducting the diodes 22 and 25 are back biased so that the antenna 12 is effectively isolated from the antenna 11 and from the receiver. The diode 22 offers impedance in the antenna circuit and the diode 25 opens the remote end of the line 23 so that the end connected to the antenna circuit shorts this circuit to ground. However, when current flows through diodes 22 and 25 to reduce their impedance, the antenna 12 will be effectively connected to the receiver, and the antenna 11 will be isolated therefrom as at this time diodes 14 and 17 will be back biased.

The switching action between the stages of the multivibrator will be extremely rapid and this will cause extremely rapid switching from one antenna to the other when the signal falls below the predetermined value. The switching time for changing connections from one antenna to the other is negligible.

The following table lists values of components which have been found to provide satisfactory operation in an actual system which has been used. It is pointed out, however, that these values are merely representative and are not to be considered as limiting the invention, and other values may be preferable in a different application.

| | |
|---|---|
| Capacitor **13** | 470 micromicrofarads |
| Diode **14** | Transition type S673G |
| Capicitor **16** | 470 micromicrofarads |
| Inductor **18** | .5 microhenry |
| Capacitor **21** | 470 micromicrofarads |
| Diode **22** | Transition type S673G |
| Capacitor **24** | 470 micromicrofarads |
| Inductor **26** | .5 microhenry |
| Inductor **28** | .5 microhenry |
| Capacitor **34** | 3600 micromicrofarads |
| Inductor **35** | .0.5 henry |
| Transistor **36** | Type 2N651 |
| Resistor **37** | 1 kilohm |
| Resistor **38** | 2.2 kilohms |
| Capacitor **39** | 1 microfarad |
| Resistor **40** | 50 kilohm max. |
| Transistor **41** | Type 2N651 |
| Transistor **42** | Type 2N651 |
| Resistor **43** | 1.8 kilohm |
| Resistor **44** | 220 ohms |
| Resistor **45** | 6.8 kilohms |
| Resistor **46** | 1.2 kilohms |
| Resistor **47** | 1.8 kilohms |
| Transistor **51** | Type 2N651 |
| Resistor **52** | 2.2 kilohms |
| Resistor **53** | 3.3 kilohms |
| Transistor **55** | Type 2N651 |
| Transistor **56** | Type 2N651 |
| Resistor **57** | 330 ohms |
| Capacitor **58** | .5 microfarad |
| Resistor **59** | 15 ohms |
| Resistor **60** | 1.5 kilohms |
| Resistor **61** | 2.2 kilohms |
| Resistor **62** | 330 kilohms |
| Capacitor **63** | .5 microfarad |
| Resistor **64** | 15 kilohms |
| Resistor **65** | 1.5 kilohms |
| Resistor **66** | 2.2 kilohms |
| Resistor **67** | 12 kilohms |
| Capacitor **68** | .25 microfarad |
| Resistor **69** | 12 kilohms |
| Capacitor **70** | .25 microfarad |
| Diode **71** | Transition type SG419 |
| Diode **72** | Transition type SG419 |

The antenna switching circuit may respond to a signal other than noise such as a tone which is transmitted with a desired signal. In such case the tone can be selected by a tuned detector circuit as described. The detector will therefore produce an increased output signal when a desired signal is received rather than when an undesired signal is received as when operating on noise. The trigger circuit in such case can be arranged so that transistor 42 will conduct when the desired signal is received to provide the proper potential for holding the multivibrator latched at the collector of this transistor. The switch 50 will then be placed in the dotted position so that the potential from the collector of transistor 42 is applied to the base of transistor 51 to provide bias current through resistor 53 to the terminal 73 of the multivibrator. This current will hold a stage 55 or 56 conducting so that the antennas will not be switched when a desired signal is received. The system can operate upon the amplitude of the tone to provide switching when the tone falls below a predetermined value so that the same advantages of diversity reception is obtained as when operating on noise signals.

The diversity receiving system described has been found to provide highly satisfactory operation in mobile systems. The transistor detector responds to signals of a particular frequency, which may be either a transmitted tone, or noise within a particular band, to provide a control voltage. This circuit has the advantage of extreme simplicity and stability and also that it presents a high input impedance so that it does not load the signal source. Further, it has a low output impedance so that it may be conveniently coupled to a transistor trigger circuit. The antenna switching circuit and multivibrator for controlling the same provide extremely rapid operation so that the antennas are alternately switched into the circuit until one provides signals at a level for good reception, with the antenna remaining connected until the signal therefrom fades. When a fade occurs the antennas are rapidly switched so that the signal is not interrupted to cause improper operation of any equipment which responds thereto.

I claim:

1. A diversity receiving system including in combination, a single radio receiver having an input for receiving radio frequency signals and an audio output, first and second spaced antennas for supplying signals to said receiver, a switching circuit connected to the first and second antennas and to the receiver, said switching circuit including first and second terminals and selectively individually coupling and decoupling the first and second antennas with the receiver in response to potentials applied to said terminals, a control circuit connected to said first and second terminals respectively for applying potentials thereto, said control circuit having a control terminal and including means operating to connect one of the antennas to the receiver in response to the application of a control signal of a predetermined value to said control terminal and to automatically connect the first and second antennas alternately to the receiver in the absence of such control signal, filter means coupled to said audio output of said receiver for deriving noise signals therefrom, tuned detector means coupled to said filter means for producing a control voltage varying with said noise signals, and means responsive to said control voltage for applying to said control terminal a control signal of said predetermined value in response to noise accompanying a usable signal, and with the control signal falling below said predetermined value in response to noise accompanying a non-usable signal, whereby said control circuit acts to alternately connect the first and second antennas to the receiver when a non-usable signal is received and such action continues until one antenna provides a usable signal, and said control circuit holds such antenna connected until the signal drops to a non-usable value.

2. A diversity receiving system including in combination, a single radio receiver having an input for receiving radio frequency signals and an audio output, first and second spaced antennas for supplying signals to said receiver, a switching circuit connected to the first and second antennas and to the receiver, said switching circuit including first and second terminals and selectively individually coupling and decoupling the first and second antennas with the receiver in response to potentials applied to said terminals, a multivibrator including first and second stages connected to said first and second terminals respectively for applying potentials thereto, said multivibrator having a latching circuit with a control terminal and operating to hold one of the stages conducting in response to the application of a control signal of a predetermined value to said control terminal and including means causing said first and second stages to automatically alternately conduct in the absence of such control signal, detector means coupled to said audio output of said receiver for producing a control voltage in accordance with a characteristic of the received signals, and means responsive to said control voltage for applying to said control terminal a control signal of said predetermined value in response to desired received signals, and with the control signal falling below said predetermined value in response to undesired received signals, whereby said multivibrator acts to alternately connect the first and second antennas to the receiver when an undesired signal is received and then holds the antenna providing a desired signal connected as long as such antenna provides a desired signal.

3. In a diversity receiving system including first and second spaced antennas for supplying signals to a frequency modulation receiver, the system for selectively connecting the antennas to the receiver including in combination, a switching circuit connected to the first and second antennas and to the receiver, said switching circuit including first and second terminals and selectively individually coupling and decoupling the first and second antennas with the receiver in response to potentials applied to said terminals, a multivibrator circuit including first and second stages connected to said first and second terminals respectively for applying potentials thereto, said multivibrator having a control terminal and means operating to hold one of the stages conducting in response to the application of a predetermined current to said control terminal and to automatically cause said first and second stages to alternately conduct in response to the application of current less than said predetermined current to said control terminal, filter means for deriving noise signals from the receiver output, tuned detector means coupled to said filter means for producing a control voltage varying with said noise signals, trigger means coupled to said detector means and responsive to said control voltage to provide a first potential when said control voltage reaches the value produced by noise accompanying a usable signal and to provide a second smaller potential when said control voltage reaches the value produced by noise accompanying a non-usable signal, and means coupled to said trigger means and to said control terminal to provide said predetermined current in response to said first potential and to provide less current in response to said second potential, whereby said multivibrator holds the antenna providing a usable signal connected until the signal drops to a non-usable value and then alternately connects the first and second antennas to the receiver until a usable signal is received by one of said antennas.

4. In a diversity receiving system including first and second spaced antennas for supplying signals to a radio receiver, the system for selectively connecting the antennas to the receiver including in combination, a switching circuit including first and second portions individually coupled to the first and second antennas for selectively connecting the same to the receiver, a multivibrator circuit including first and second stages connected to said first and second portions respectively for rendering the same operative, said multivibrator having a control terminal and means operating to hold one of the stages conducting in response to the application of a predetermined current to said control terminal and to automatically cause said first and second stages to alternately conduct in response to the application of a current less than said predetermined current to said control terminal, means coupled to the receiver output for producing a control voltage in response to received signals, trigger means responsive to said control voltage to provide a first potential when said control voltage reaches the value produced by a desired signal and to provide a second potential when said control voltage reaches the value produced by an undesired signal, and means coupled to said trigger means and to said control terminal to provide said predetermined current in response to said first potential and to provide less current in response to said second potential, whereby said multivibrator holds the antenna providing a desired signal connected and alternately connects the first and second antennas to the receiver when an undesired signal is received.

5. In a diversity receiving system including first and second spaced antennas for supplying signals to a radio receiver, the system for selectively connecting the antennas to the receiver including in combination, a switching circuit including first and second portions individually connected to the first and second antennas and connected to the receiver, said portions being selectively and individually operable to couple the first and second antennas to the receiver, a multivibrator circuit including first and second stages connected to said first and second portions respectively for rendering the same operative, said multivibrator having a control terminal and operating to hold one of the stages conducting in response to the application of a predetermined current to said control terminal and to cause said first and second stages to alternately conduct in response to the application of a current less than said predetermined current to said control terminal, means coupled to the receiver output for producing different control voltages in response to received signals having different characteristics, trigger means responsive to said control voltages and having first and second terminals, with said first terminal providing a given potential in response to a signal having a first desired characteristic and said second terminal providing the given potential in response to a signal having a second desired characteristic, means coupled to said control terminal of said multivibrator to provide said predetermined current in response to said given potential, and switch means for selectively connecting said last named means to said first and second terminals to provide operation in response to a signal having one of said first and second desired characteristics, whereby said multivibrator holds the antenna providing a desired signal connected and alternately connects the first and second antennas to the receiver when an undesired signal is received.

6. In a diversity receiving system including first and second spaced antennas for supplying signals to a receiver, the system for selectively connecting the antennas to the receiver including in combination, a switching circuit including first and second portions individually connected to the first and second antennas and connected to the receiver and operative to selectively connect the antennas to the receiver, a control circuit connected to said first and second portions respectively for rendering the same operative, said control circuit having a control terminal and means operating to hold one of the antennas connected to the receiver in response to the application of a predetermined current to said control terminal and to automatically connect the first and second antennas to the receiver alternately in response to the application of a current less than said predetermined current to said control terminal, detector means coupled to the receiver output for producing a control voltage varying with a characteristic of the received signals, trigger means coupled to said detector means and responsive to said control voltage to provide a first potential when said control voltage reaches the value produced by a desired signal and to provide a second potential when said control voltage reaches the value produced by an undesired signal, and a transistor emitter follower circuit connected to said trigger means and responsive to the voltage provided thereby, said emitter follower circuit being connected to said control terminal to provide said predetermined current in response to said first potential and to provide less current in response to said second potential, whereby said control circuit holds the antenna providing a usable signal connected until the signal drops to a non-usable value and then alternately connects the first and second antennas to the receiver until a usable signal is received.

7. In a diversity receiving system including first and second spaced antennas for supplying signals to a receiver, the system for selectively connecting the antennas to the receiver including in combination, a switching circuit including first and second portions individually connected to the first and second antennas and connected to the receiver and operative to selectively couple the antennas to the receiver, a multivibrator including first and second stages connected to said first and second portions respectively for selectively rendering the same operative, said multivibrator having a latching circuit which is operative to hold one of the stages conducting in response to a control signal of a predetermined value and means causing said first and second stages to automatically alternately conduct when the control signal falls below said predetermined value, detector means coupled to the receiver output for deriving particular signals, said detector means including a resonant input circuit having an inductor across which stepped up signals are developed, a transistor having input electrodes and an output electrode coupled to load means, said input electrodes being connected to said inductor for rectifying and amplifying signals thereacross to produce a control voltage across said load means, and means coupled to said load means and responsive to said control voltage for applying to said latching circuit a control signal of predetermined value in response to a control voltage produced by a desired signal and a control signal falling below said predetermined value in response to a control voltage produced by an undesired signal, whereby said multivibrator holds the antenna providing a desired signal connected until an undesired signal is received and then acts to alternately connect the first and second antennas to the receiver until a desired signal is received.

8. In a diversity receiving system including first and second spaced antennas for supplying signals to a receiver, the system for selectively connecting the antennas to the receiver including in combination, a switching circuit including first and second portions individually connected to the first and second antennas and connected to the receiver and operative to selectively couple the antennas to the receiver, a control circuit connected to said first and second portions respectively for selectively rendering the same operative, said control circuit including means operating in response to a control signal of a predetermined value to couple one of the antennas to the receiver and operating when the control signal falls below said predetermined value to automatically alternately couple the first and second antennas to the receiver, detector means coupled to the receiver output for deriving particular signals, said detector means having an input circuit including capacitor means and inductor means connected in series and having values to provide resonance at the frequency of the particular signals, a transistor having base, emitter and collector electrodes, said transistor being connected in a common emitter circuit with resistor means connecting said emitter electrode to a common point, means connecting said inductor means between said base electrode and said common point to provide rectifier action in said transistor, output means coupled to said common point and said collector electrode for deriving amplified detected signals therefrom to form a control voltage, whereby said detector means has relatively high input impedance for signals applied to said input circuit and a relatively low output impedance for control voltages produced thereby, and means coupled to said output means and responsive to said control voltage for applying to said control circuit a control signal reaching said predetermined value in response to a desired signal and with said control signal falling below said predetermined value in response to an undesired signal, whereby said control circuit holds the antenna providing a desired signal connected until an undesired signal is received and then acts to alternately connect the first and second antennas to the receiver until a desired signal is received.

9. In a diversity receiving system including first and second spaced antennas for supplying signals to a receiver, the system for selectively connecting the antennas to the receiver including in combination, a switching circuit including first and second portions individually connected to the first and second antennas and connected to the receiver and selectively operative for coupling the first and second antennas to the receiver, each of said circuit portions including a first diode in series between the antenna and the receiver, a transmission line having inner and outer conductors with the inner conductor at one end of the line being connected between the antenna and said first diode, a second diode connected between the inner and outer conductors of the transmission line at the end thereof opposite to said one end for selectively shorting the same, and means forming a circuit through said first and second diodes and having a terminal for applying potentials to said diodes for biasing the same, a control circuit connected to said terminals of said first and second portions respectively of said switching circuit for applying potentials thereto, said control circuit having a control terminal and operating in response to the application of a control signal of predetermined value to said control terminal to apply a potential to one of said terminals and in the absence of such signal to apply potentials to said terminals alternately, detector means coupled to the receiver for producing a control voltage in response to predetermined received signals, and means responsive to said control voltage for applying a control signal to said control terminal to thereby control the operation of said circuit portions.

10. In a diversity receiving system including first and second spaced antennas for supplying the signals to a frequency modulation receiver, the system for selectively connecting the antennas to the receiver including in combination, a switching circuit including first and second portions individually connected to the first and second antennas and connected to the receiver and selectively operative for coupling the first and second antennas to the receiver, each of said circuit portions including a first diode connected in series from an antenna to the receiver, a quarter wave line connected at one end between the antenna and said first diode, a second diode connected to the other end of said quarter wave line, a direct current circuit including said diodes for selectively holding said diodes conducting and nonconducting, whereby said first diode forms an isolating impedance and said second diode causes said transmission line to short circuit the antenna when said diodes are nonconducting to effectively disconnect the antenna from the receiver, and said diodes have low impedance to couple the antenna to the receiver when said diodes are conducting, a multivibrator including first and second stages connected to said direct current circuits of said first and second portions respectively of said switching circuit for alternately applying potentials thereto for holding said diode of said first circuit portion and said diodes of said second circuit portion alternately conducting and non-conducting, said multivibrator having a latching circuit with a control terminal and operating to hold one of the stages conducting in response to the application of a control signal of a predetermined value to said control terminal and to cause said first and second stages to alternately conduct in the absence of such signal, detector means coupled to the receiver for producing a control voltage in response to predetermined received signals, and means responsive to said control voltage for applying a control signal to said control terminal to thereby control the operation of said multivibrator.

11. A switching system for selectively connecting a first circuit to a second circuit for applying signals of a predetermined frequency from said first circuit to said second circuit including in combination, a first diode connected in series from said first circuit to said second circuit, a quarter wave line having inner and outer conductors with said inner conductor being connected at one end to said first circuit, a second diode connected between the inner and outer conductors at the other end of said quarter wave line, a direct current circuit including said diodes for selectively holding said diodes conducting and nonconducting, whereby said first diode forms an isolating impedance and said second diode causes said transmission line to short circuit said first circuit when said diodes are nonconducting to effectively disconnect said first circuit from said second circuit, and said diodes have low impedance to couple said first circuit to said second circuit when said diodes are conducting.

12. A switching system for selectively connecting a first circuit and a second circuit to a third circuit for selectively applying signals of a predetermined frequency from said first and second circuits to said third circuit, said system including in combination, a first diode connected in series from said first circuit to said third circuit, a first quarter wave line connected at one end to said first circuit, a second diode connected to the other end of said first quarter wave line, a third diode connected in series from said second circuit to said third circuit, a second quarter wave line connected at one end to said second circuit, a fourth diode connected to the other end of said second quarter wave line, means connecting said third circuit to a potential source, first and second terminals connected to said second and fourth diodes respectively, and control means connected to said first and second terminals for selectively causing current flow through said first and second diodes and through said third and fourth diodes, with said first diode forming an isolating impedance and said second diode causing said transmission line to short circuit said first circuit when said first and second diodes are nonconducting to effectively disconnect said first circuit from said third circuit, and said first and second diodes have low impedance to couple said first circuit to said third circuit when said diodes are conducting, and said third and fourth diodes effectively disconnecting said second circuit from said third circuit when nonconducting and coupling said second circuit to said third circuit when said diodes are conducting.

13. In a diversity receiving system including first and second spaced antennas for supplying signals to a receiver, the system for selectively connecting the antennas to the receiver including in combination, a switching circuit including first and second portions individually connected to the first and second antennas and connected to the receiver and selectively operative for coupling the first and second antennas to the receiver, each of said circuit portions including a first diode connected in series from an antenna to the receiver, a quarter wave line connected at one end between the antennas and said first diode, a second diode connected to the other end of said quarter wave line, and a direct current circuit including said diodes for selectively holding said diodes conducting and nonconducting, whereby said first diode forms an isolating impedance and said second diode causes said transmission line to short circuit the antenna when said diodes are nonconducting to effectively disconnect the antenna from the receiver, and said diodes having low impedance to couple the antenna to the receiver when said diodes are conducting, a control circuit connected to said direct current circuits of said first and second portions respectively of said switching circuit for alternately applying potentials thereto for holding said diodes of said first circuit portion and said diodes of said second circuit portion alternately conducting and nonconducting, said control circuit energizing one of said direct current circuits in response to a predetermined current and alternately energizing said direct current circuits in the absence of such current, detector means coupled to the receiver output for deriving particular signals, said detector means having an input circuit including capacitor means and inductor means connected in series and having values to provide resonance at the frequency of the particular signals, a transistor having base, emitter and collector electrodes, means connecting said base and emitter electrodes across said inductance means to provide rectifier action, output means connected to said emitter and collector electrodes for deriving amplified detected signals therefrom to form a control voltage, said detector means having relatively high input impedance for signals applied to said input circuit and a relatively low output impedance for control voltage produced thereby, and means coupled to said output means and responsive to said control voltage for applying to said control circuit control current of said predetermined value in response to a desired signal and with said control current falling below said predetermined value in response to an undesired signal, whereby said control circuit holds the antenna providing a desired signal connected until an undesired signal is received and then acts to alternately connect the first and second antennas to the receiver until a desired signal is received.

14. A diversity receiving system including in combination, a frequency modulation receiver for receiving radio frequency signals and producing an audio output, first and second spaced antennas for supplying signals to said frequency modulation receiver, a switching circuit including first and second portions individually connected to said first and second antennas, said first portion including a first diode connected in series from the first antenna to the receiver, a first quarter wave line connected at one end between the first antenna and said first diode, and a second diode connected to the other end of said first quarter wave line, said second portion including a third diode connected in series from the second antenna to the receiver, a second quarter wave line connected at one end between the second antenna and said third diode, and a fourth diode connected to the other end of said second quarter wave line, means connecting the common connection between said first and third diodes to a potential source, first and second terminals connected to said second and fourth diodes respectively for causing current flow through said first and second diodes and through said third and fourth diodes, with said first diode forming an isolating impedance and said second diode causing said transmission line to short circuit the first antenna when said first and second diodes are nonconducting to effectively disconnect the first antenna from the receiver, and said first and second diodes having low impedance to couple the first antenna to the receiver when said diodes are conducting, and said third and fourth diodes effectively disconnecting the second antenna from the receiver when nonconducting and coupling the second antenna to the receiver when said diodes are conducting, a multivibrator including first and second stages connected to said first and second terminals respectively of said switching circuit for alternately causing current flow through said first and second portions for holding said diodes of said first portion and said diodes of said second portion alternately conducting and nonconducting, and a latching circuit coupled to said stages whereby said stages form a bi-stable circuit in response to the application of a predetermined current and form a multivibrator in the absence of such current, filter means coupled to said receiver output for deriving noise signals therefrom, detector means having an input circuit including capacitor means and inductor means connected in series and having values to provide resonance at the frequency of the particular signals, means applying noise signals from said filter means to said input circuit, a transistor having base, emitter and collector electrodes, means connecting said base and emitter electrodes across said inductance means to provide rectifier action, output means connected to said emitter and collector electrodes for deriving amplified detected signals therefrom to form a control voltage, whereby said detector means has relatively high input impedance for signals applied to said input circuit and a relatively low output impedance for control voltages produced thereby, trigger means coupled to said output means and responsive to said control voltage to provide a first potential when said control voltage reaches the value produced by noise accompanying a usable signal and to provide a second potential when said control voltage reaches the value produced by noise accompanying a nonusable signal, and a transistor emitter follower circuit connected to said trigger means and responsive to the voltage provided thereby, said emitter follower circuit being connected to said latching circuit to provide said predetermined current in response to said first potential and to provide less current in response to said second potential, whereby said multivibrator holds the antenna providing a usable signal connected until the signal drops to a nonusable value and then alternately connects the first and second antennas to the receiver until a usable signal is received.

15. A detector circuit including in combination, a transistor having base, emitter and collector electrodes, unbypassed resistor means connected between said emitter electrode and a common point to provide a common emitter configuration with degenerative feedback, means connecting said collector electrode to a fixed voltage point, input circuit means including series connected capacitor means and inductor means having values to provide series resonance at the frequency of signals to be detected, means connecting said inductor means between said base electrode and said common point to provide a high impedance input circuit path between said rectifying base and emitter electrodes, and output circuit means including a resistor shunted by a filtering capacitor connected between said common point and a reference potential point, whereby amplified detected signals unidirectional in nature appear at said common point and said detector circuit has relatively high impedance for signals applied thereto and a relatively low output impedance for detector voltages produced thereby.

References Cited in the file of this patent

UNITED STATES PATENTS

| | | |
|---|---|---|
| 2,243,118 | Peterson | May 27, 1941 |
| 2,572,912 | Bucher | Oct. 30, 1951 |
| 2,685,643 | Fisk et al. | Aug. 3, 1954 |
| 2,719,226 | Gordon et al. | Sept. 27, 1955 |
| 2,786,133 | Dyke | Mar. 19, 1957 |
| 2,854,568 | Lewin et al. | Sept. 30, 1958 |
| 2,872,568 | Provaz | Feb. 3, 1959 |
| 2,885,544 | Radcliffe | May 5, 1959 |
| 2,891,146 | Sciurba | June 16, 1959 |
| 2,904,677 | Heidester | Sept. 15, 1959 |
| 2,915,603 | Jacobsen | Dec. 1, 1959 |
| 2,941,076 | Congdon et al. | June 14, 1960 |